United States Patent
Miller et al.

(10) Patent No.: US 7,919,940 B2
(45) Date of Patent: Apr. 5, 2011

(54) SYSTEM AND METHOD FOR JERK LIMITED TRAJECTORY PLANNING FOR A PATH PLANNER

(75) Inventors: Daniel H. Miller, Charlottesville, VA (US); William Lindsay Morrison, Charlottesville, VA (US)

(73) Assignee: GE Intelligent Platforms, Inc., Charlottsville, VA (US)

( * ) Notice: Subject to any disclaimer, the term of this patent is extended or adjusted under 35 U.S.C. 154(b) by 491 days.

(21) Appl. No.: 11/875,913

(22) Filed: Oct. 21, 2007

(65) Prior Publication Data

US 2009/0102411 A1 Apr. 23, 2009

(51) Int. Cl.
*G05B 19/19* (2006.01)

(52) U.S. Cl. ......... 318/163; 318/626; 318/636; 388/904

(58) Field of Classification Search .......... 318/162–164, 318/560, 565, 626, 636, 652, 569–573; 388/904
See application file for complete search history.

(56) References Cited

U.S. PATENT DOCUMENTS

| | | | |
|---|---|---|---|
| 4,723,977 A | | 2/1988 | Grant et al. |
| 4,751,984 A | * | 6/1988 | Williams et al. ............. 187/293 |
| 4,769,583 A | | 9/1988 | Goor |
| 4,775,903 A | * | 10/1988 | Knowles ................... 360/78.07 |
| 5,950,799 A | * | 9/1999 | Peltier et al. ................. 198/430 |
| 6,002,231 A | * | 12/1999 | Dirkx et al. .................. 318/609 |
| 6,046,564 A | * | 4/2000 | Kim ......................... 318/568.15 |
| 6,216,058 B1 | * | 4/2001 | Hosek et al. .................. 700/245 |
| 6,643,563 B2 | * | 11/2003 | Hosek et al. .................. 700/245 |
| 6,850,386 B2 | * | 2/2005 | Kovinskaya et al. ...... 360/78.06 |
| 7,170,581 B2 | * | 1/2007 | Tousain ......................... 355/53 |
| 7,462,998 B2 | * | 12/2008 | Akiyama ...................... 318/162 |
| 2004/0002778 A1 | | 1/2004 | Giamona et al. |
| 2004/0225382 A1 | | 11/2004 | Brown et al. |
| 2005/0077484 A1 | * | 4/2005 | Galburt et al. ............. 250/492.1 |
| 2006/0197481 A1 | | 9/2006 | Hotto et al. |
| 2007/0091094 A1 | * | 4/2007 | Hong et al. ................... 345/474 |

FOREIGN PATENT DOCUMENTS

| | | |
|---|---|---|
| DE | 102004059966 B3 | 6/2006 |
| EP | 0268491 A2 | 5/1988 |
| EP | 1465034 A1 | 10/2004 |
| WO | 9612992 A1 | 5/1996 |
| WO | 9810340 A1 | 3/1998 |

OTHER PUBLICATIONS

PCT/US2008/072966, International Search Report and Written Opinion, Nov. 30, 2010.

* cited by examiner

*Primary Examiner* — Bentsu Ro
(74) *Attorney, Agent, or Firm* — Global Patent Operation; Mark A. Conklin (57) ABSTRACT

A system for generating a motion profile in real time includes a processor. The processor breaks a move into a first phase and a second phase. The first phase includes commanding the move toward a constant velocity segment, and the second phase includes monitoring the first phase to determine when during a move in progress it is necessary to implement a jerk value required to successfully reach end conditions. The processor also transmits command signals based upon the motion profile and calculates the point at which the second phase must take control of the move in progress to reach a target position. The system further includes at least one input/output module that receives command signals. A method for generating a motion profile in real time is also presented.

20 Claims, 8 Drawing Sheets

SYSTEM AND METHOD FOR JERK LIMITED TRAJECTORY PLANNING FOR A PATH PLANNER

BACKGROUND OF THE INVENTION

1. Field of the Invention

The subject matter described herein relates generally to automated motion controllers and, more particularly, to jerk limited trajectory planning.

2. Related Art

Path planners or path generators typically comprise motion controllers. Path planners are used to control mechanical devices requiring motion and determine the movements of controlled elements in the mechanical devices. Mechanical devices that employ path planning can be found in various industrial systems such as manufacturing, assembling, packaging and other capacities. Servomotors, for example, are one such type of device. Other motors may control the movements of elements such as drill bits or robotic arms.

Path generators use various kinetic path algorithms along with discrete time controllers to provide path profiles. The path profiles are based on specified motion parameters. The specified motion parameters may include the following command inputs: end position, maximum velocity, maximum acceleration, maximum deceleration, and commanded jerk. The move's initial conditions are defined by the initial state of the path planner, so initial position, initial velocity, initial acceleration, and initial jerk are also known values.

Jerk is defined as the rate of change of acceleration or acceleration slope. Thus, jerk is the derivative of acceleration and is an important variable in many applications where a smooth start is required. The kinematic equations for generating constant jerk paths from an initial position to a final position subject to acceleration, deceleration, and velocity constraints are well known. Therefore, the known values stated above along with the kinematic equations form an equation set that can be then solved to yield the desired trajectory.

The interrelated kinematic equations can be solved prior to performing any motion based on the known/unknown variables. This method does result in a solution, but it requires complex calculations that are not readily adaptable to real time implementations. Furthermore, in many cases, a complex solution results that does not yield a closed form.

Therefore, a means to generate a time based profile that satisfies the initial and final conditions while not exceeding programmed limit values is desirable as well as providing a solution set that can be solved in a real time controller.

BRIEF DESCRIPTION OF THE INVENTION

In accordance with an embodiment of the present invention, a system for generating a motion profile in real time comprises a processor. The processor is configured to break a move into a first phase and a second phase. The first phase comprises commanding the move toward a constant velocity segment, and the second phase comprises monitoring the first phase to determine when during a move in progress it is necessary to implement a jerk value required to successfully reach end conditions.

In another embodiment of the invention, a system for generating a motion profile in real time comprises a processor. The processor is configured to transmit command signals based upon the motion profile, break a move into a first phase and a second phase, and calculate the point at which the second phase must take control of a move in progress in order to reach a target position. The system further comprises at least one input/output module configured to receive the command signals.

In another embodiment of the invention, a method for generating a motion profile in real time comprises breaking a move into a first phase and a second phase. The method further comprises commanding the move toward a constant velocity segment during the first phase, and monitoring the first phase to determine when during a move in progress it is necessary to implement a jerk value required to successfully reach end conditions.

BRIEF DESCRIPTION OF THE DRAWINGS

The following detailed description is made with reference to the accompanying drawings, in which.

DETAILED DESCRIPTION OF THE PREFERRED EMBODIMENT

An embodiment of the present invention concerns a system and method for generating a time based motion profile that can be solved in real time and also satisfies the initial and final conditions while not exceeding programmed limit values. Limit values may be minimum or maximum values or a combination thereof.

Figure 1:
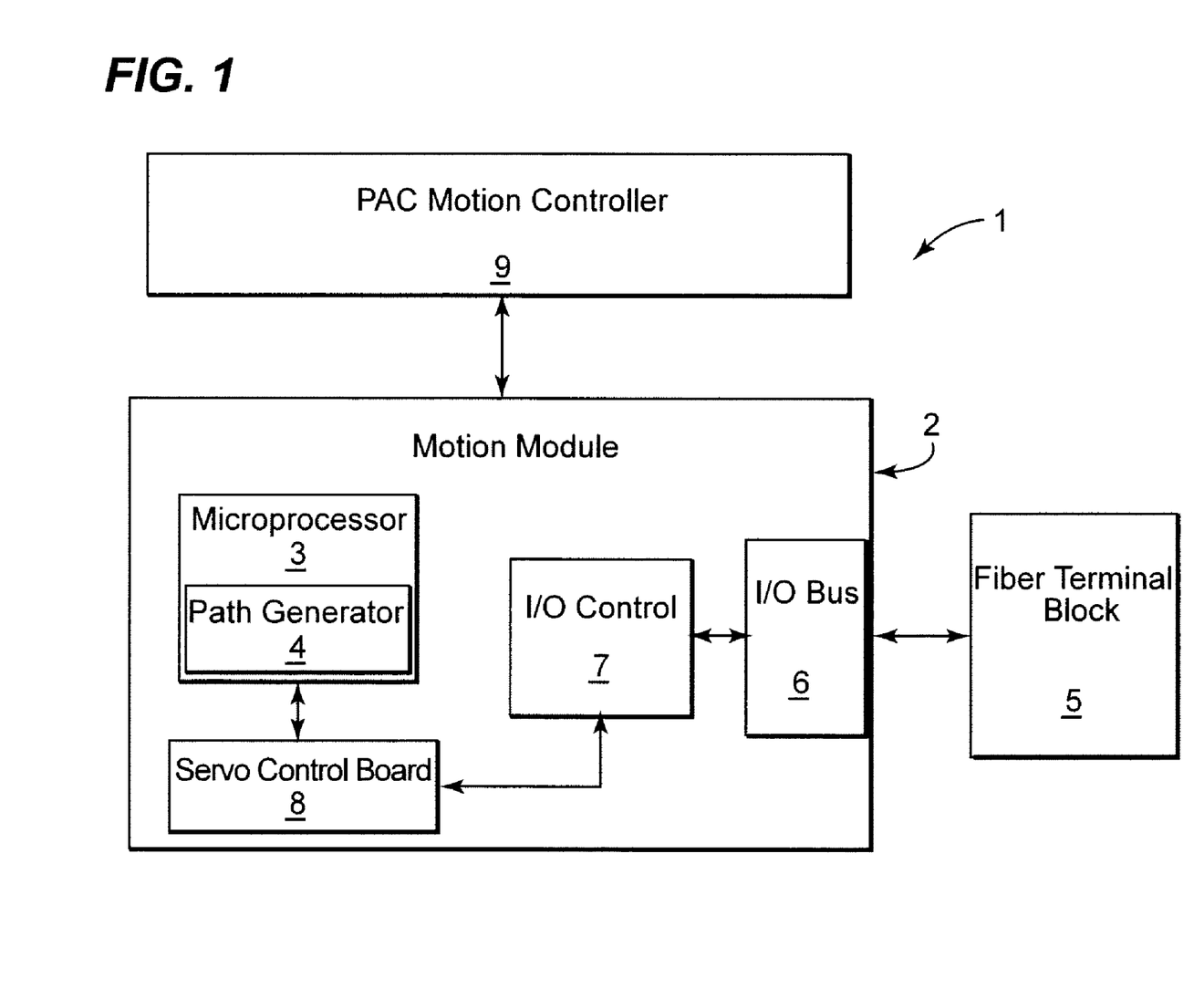
FIG. 1 is a schematic diagram of a control system implementing a path plan according to one embodiment of the invention.

Referring now to FIG. 1, a block diagram of a Programmable Automation Controller (PAC) type motion system 1 for path planning is shown according to one embodiment of the present invention. PAC system 1 includes a PAC system type motion controller 9, PAC system type motion module (PMM) fiber terminal block 5 and (PMM) motherboard 2 comprising microprocessor subsystem 3. A processor system can also be used. PMM motherboard 2 further includes several subsystems including path generator 4. Path generator 4 is a firmware subsystem that runs on microprocessor 3 that is dedicated to path planning. Other firmware subsystems that support the functions of PMM motherboard 2 include a communication bus 6, such as a PCI backplane driver, state machine, command processing, command interfaces, servo control, and other associated hardware support functions.

PAC system 1 may include multiple I/O module 7 for receiving various status, alarm, or input signals from devices. I/O module 7 is coupled to input and output devices. Although only one I/O module is shown in FIG. 1, the PAC system may include multiple I/O modules, for example, an I/O module for interfacing to a motor.

The PAC motion system also includes PMM servo control board 8. The servo control board 8 may be a daughterboard that is hosted inside the motion control module (PMM). Servo control board 8 serves as a motion controller for the controlled elements of mechanical devices such as robotic arms, for example.

Processor 3 performs various primary functions including path generation and path following. Path generation refers to the derivation of a commanded trajectory in real-time between an initial position and a target position. Path following refers to the control of a motor for effecting movement of a device such as positionable members and controlled elements, in accordance with the desired trajectory.

The optimal time path between an initial position and target position is the one that utilizes the commanded jerk values that the user programmed. However, following the optimal time path is not readily adaptable to real time applications. To follow the optimal time path, a processing device must calculate the exact time along the path when it must implement the commanded jerk value in order to reach the target position. If the exact time is calculated than the ideal trajectory is known and can be followed. Finding the exact times for the whole move requires solving complex calculations that in many cases do not yield a closed form solution.

In an embodiment of the invention, processor 3 utilizes a two-phase trajectory generation method that breaks the move into two phases. To follow the optimal time path as closely as possible in real time, processor 3 uses the user-specified commanded jerk values until the start of the second phase. Prior to commanding any motion, processor 3 calculates the jerk value required to reach the end conditions for every sample period during the move in progress. Also, during the move in progress, the commanded value for jerk is compared to the calculated jerk value required to reach the end conditions for the current sample period and compared to the calculated jerk value required to reach the end conditions for the next sample period. When the commanded value for jerk, $J_c$, lies in between the calculated jerk value for a current sample period, $J_n$, and the calculated jerk value for the next sample period, $J_{n+1}$, the jerk value implemented at time n is $J_n$. This is when the second phase of the move begins.

As a result, the motion profile follows the optimal time path as closely as possible in real time without exceeding programmed limit values or violating user-specified input command values. The motion profile exhibits the shortest time path to reach the known target position where deceleration (or acceleration) starts on a sample period. Depending on the end conditions, the jerk value to reach the end conditions may represent deceleration to a lower velocity or acceleration to a higher velocity.

Based on the motion profile generated before the start of the move, processor 3 transmits command signals for executing the move between the known initial position and known target position. I/O module 7 receives the command signals from processor 3.

Figure 2:
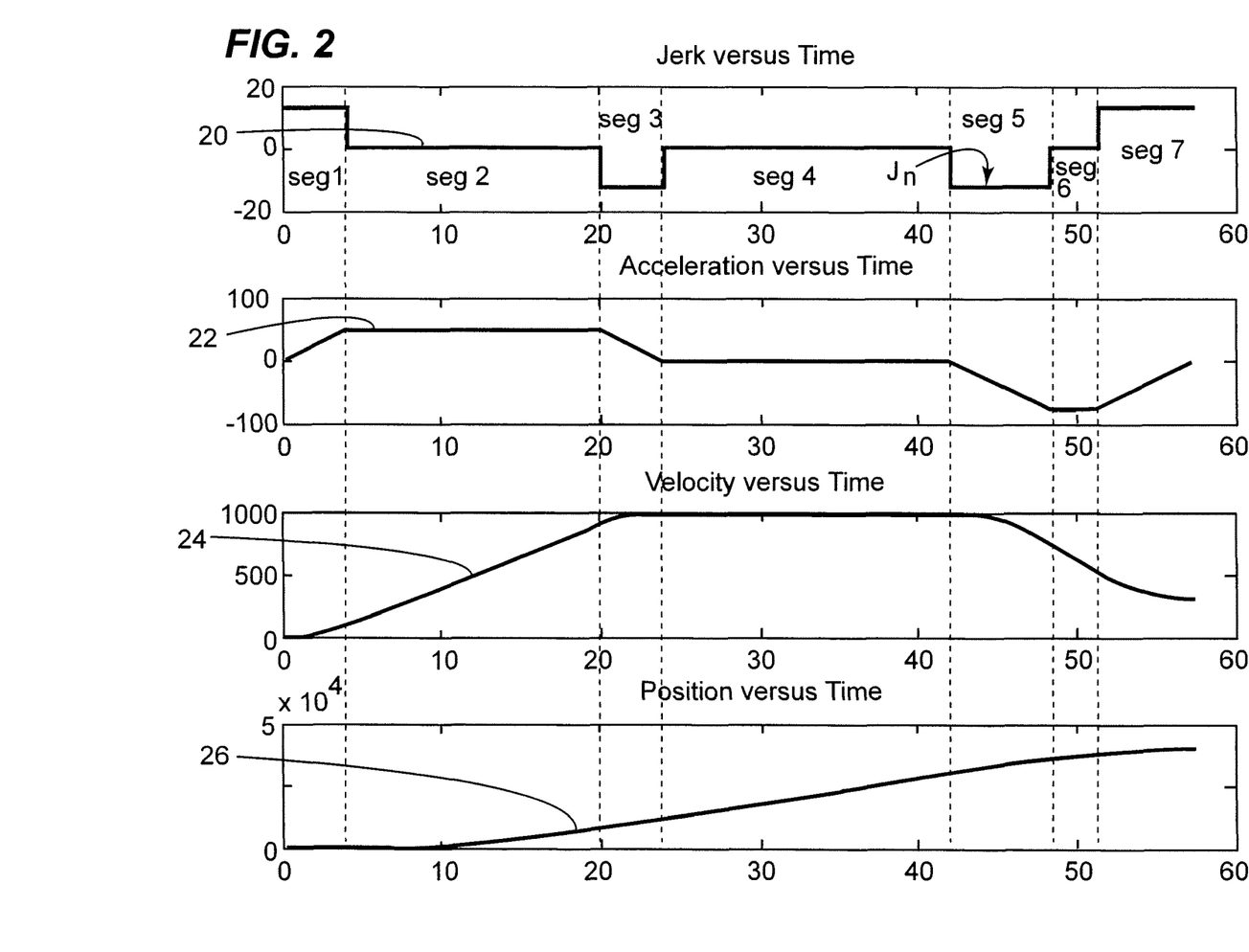
FIG. 2 is a stacked graph illustrating the seven-segments of a basic move type utilized in one embodiment of the invention by the control system of FIG. 1.

Referring now to the stacked graph of FIG. 2, a path command is shown versus time on a common time scale that was generated using the two-phase method. FIG. 2 further illustrates a basic move type where seven-segments were required to complete the move. Specifically, the seven-segments include three segments from the first phase, a constant velocity segment, and three segments from the second phase.

In constant jerk mode, jerk curve or profile 20 maintains a constant commanded value in each of segments 1-3. The second phase of the move begins at the start of segment 5. In particular, the move continues through a constant velocity segment (segment 4) until commanded jerk value, $J_c$, is greater than the calculated jerk value for a current sample period, $J_n$, but is less than the calculated jerk value for the next sample period, $J_{n+1}$. At the start of the second phase (segment 5), at time n, processor 3 implements $J_n$ as the jerk value.

Seen in FIG. 2, jerk curve 20 has a value of $J_n$ at sample time n and throughout the duration of segment 5. The values of jerk for segments 5, 6, and 7 will always be less than or equal to the command values. In this exemplary case, the jerk value required to reach the end conditions represents a deceleration to a lower velocity.

In FIG. 2, acceleration curve 22 exhibits the acceleration corresponding to jerk curve 20 throughout the move and reaches its maximum value in segment 2. Velocity curve 24 exhibits the velocity corresponding to jerk curve 20 and acceleration curve 22 throughout the move. Velocity reaches its maximum value in segment 4. The displacement for a controlled device is shown by displacement curve 26, which corresponds to jerk 20, acceleration 22, and velocity 24 profiles.

A two-phase move with a constant velocity segment results from a point-to-point move where all of the non-controlled variables reach maximum values. Velocity, acceleration, and deceleration all reach their maximum value. Table 1 describes each segment and its unique aspects.

TABLE 1

| Segment Number | Description |
|---|---|
| 1 | Constant jerk segment utilizing the specified jerk to control the increase in acceleration rate. The segment ends once either the maximum constant acceleration is reached and jerk changes to zero, or it is necessary to reduce the acceleration rate to meet the desired end conditions. |
| 2 | Zero jerk/constant acceleration segment where constant acceleration is the supplied maximum value. The segment ends when it is necessary to command a constant jerk to reduce acceleration to reach either the user specified maximum velocity or a value less than the maximum required for the move to reach desired end conditions. |
| 3 | Constant negative jerk segment utilizing the specified jerk to control the decline in acceleration rate. The segment ends once acceleration and jerk are zero and either the specified maximum constant velocity is reached or the peak velocity necessary to reach end conditions is met. |
| 4 | Zero jerk, zero acceleration, and constant velocity segment. The segment ends when it becomes necessary to command a negative constant jerk to decelerate to reach the desired position. |

TABLE 1-continued

| Segment Number | Description |
| --- | --- |
| 5 | Constant negative jerk segment utilizing the specified jerk to control the increase in deceleration rate. The segment ends one constant deceleration is reached and jerk becomes zero or it is necessary to reduce the deceleration rate to meet the desired end conditions. |
| 6 | Zero jerk, constant deceleration segment where the constant deceleration is supplied. The segment ends when it is necessary to command a jerk to reduce the deceleration rate to reach the desired end conditions. |
| 7 | Constant jerk segment utilizing the specified jerk to control the decline in deceleration rate. The segment ends once motion reaches desired end conditions. |

In an embodiment of the invention, processor 3 utilizes constant jerk mode to calculate the motion profile. In this case, jerk is the controlled variable, and acceleration and velocity are maximum values not to exceed. To simplify the path planning algorithm, processor 3 calculates the jerk value required to successfully meet the end conditions while the move is in progress. This is also known as the deceleration solution. However, depending on the end conditions, the jerk value required to reach the end conditions may represent deceleration to a lower velocity or acceleration to a higher velocity.

In the two-phase trajectory generation method, the first phase commands the move to reach the constant velocity segment. The second phase constantly monitors the move in-progress to determine the point at which deceleration must start to reach the target position or desired final conditions. The first phase is used to plan the initial motion. Thus, it is only required to perform the first phase calculations on the sample period that the new command arrives. The second phase is run to determine when it is time for the second phase to take control to reach the end conditions.

Although it is desirable to run both the first phase and second phase calculations on the initial sample period that the move is commanded, it is not a requirement. To balance the processing load, processor 3 can split processing the first phase and the second phase calculations across sample periods. The processing split penalizes the desired path only if the initial sample period requires that the move start the second phase on that exact period. This is a very minor penalty, and in many cases, the resulting performance improvement makes it desirable. Additional firmware is required, however, as the path planner must be able to handle processing a move where the initial conditions have already gone past the point where the second phase must take control.

The first phase commands motion to reach segment 4 (the constant velocity segment). Processor 3 does not consider segments 5-7 in the first phase. Therefore, processor 3 uses the commanded values to calculate a move that completes at the maximum commanded velocity (the start of segment 4). Although the motion profile may not reach segment 4 before the second phase begins, the complexity of the algorithm is still greatly reduced.

The second phase monitors the first phase to determine when it is necessary to decelerate or accelerate to reach the desired end conditions. Thus, the currently executing move serves as the initial conditions for the deceleration equations. This greatly reduces the complexity of the deceleration equation set since the processor only has to solve segments 5, 6, and 7.

A move requires less than seven segments when the non-controlled variables and/or initial conditions yield solutions where certain segments are no longer necessary for the time optimal solution. Therefore, processor 3 may not be required to calculate or use all of the segments to complete the move successfully in the least amount of time. Furthermore, the second phase can begin at any time after the first phase begins, even as early as when the move is in segment 1.

Input command values for jerk, velocity, acceleration and deceleration are user-specified as absolute values. However, the magnitudes of the command values are not all positive during the move. Therefore, microprocessor 3 applies the correct signs to the input command values.

Figure 3:
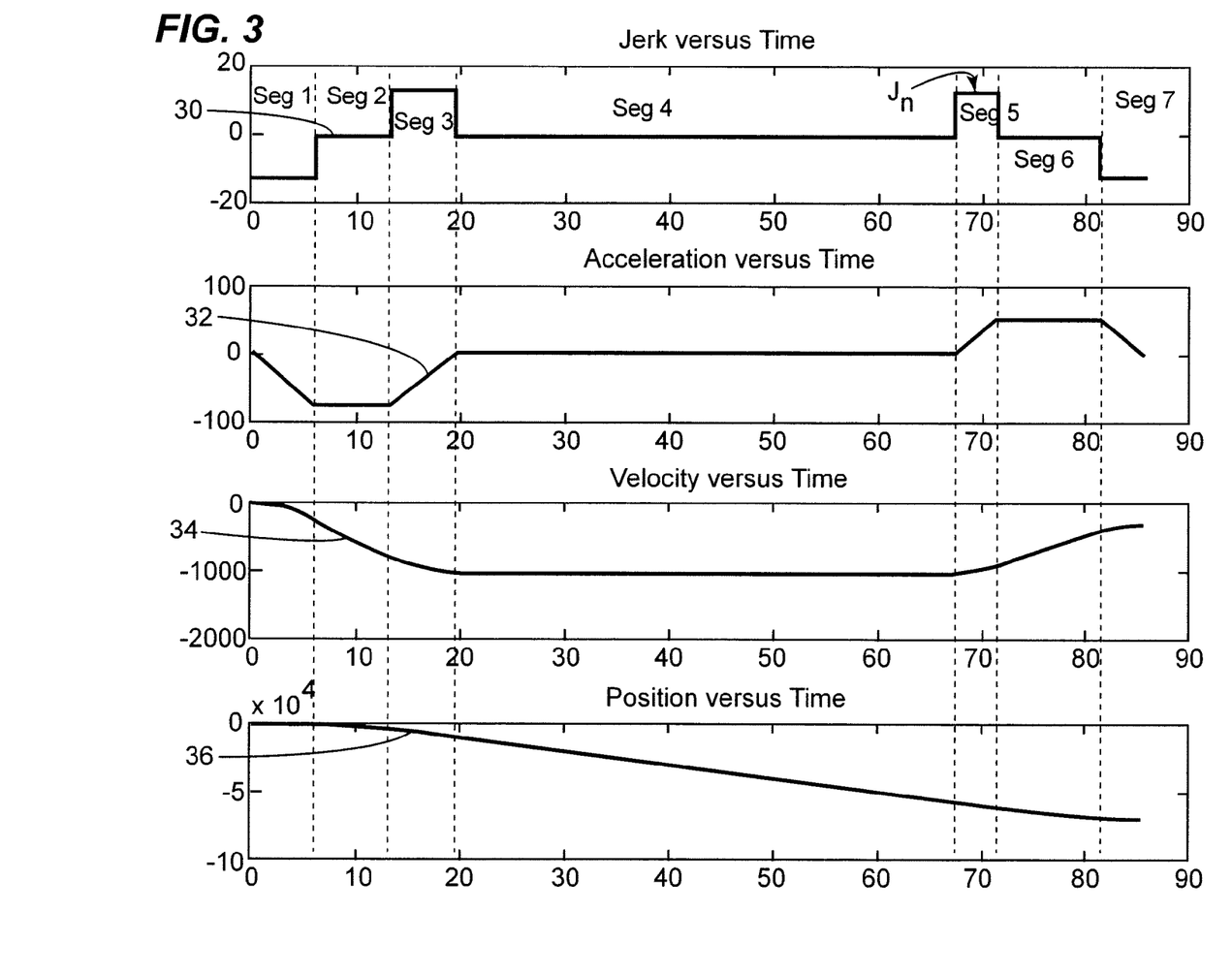
FIG. 3 is a stacked graph showing a path command versus time on a common time scale throughout seven segments.

To apply correct signs to the input values, processor 3 compares the current conditions with the commanded position. If the commanded position is greater than the initial position, velocity is positive, acceleration is positive, deceleration is negative, and initial jerk is positive. In FIG. 2, displacement curve 26 follows a profile where the commanded position is greater than the initial position. In contrast, the stacked graph of FIG. 3 shows an exemplary case where the initial position is greater than the end position for displacement curve 36. Processor 3 assigns the opposite signs to the command values. Thus, the velocity is negative, acceleration is negative, deceleration is positive, and the initial jerk is negative.

FIG. 3 is a stacked graph showing a path command versus time on a common time scale. In FIG. 3, seven-segments were required to complete the move. Like FIG. 2, the seven-segments include three segments from the first phase, a constant velocity segment, and three segments from the second phase, but the command value for jerk in segment 1 is negative.

The second phase of FIG. 3 begins at the start of segment 5. In particular, the move continues through a constant velocity segment (segment 4) until commanded jerk value, $J_c$, is greater than the calculated jerk value for a current sample period, $J_n$, but less than the calculated jerk value for the next sample period, $J_{n+1}$. At the beginning of the second phase (segment 5), at time n, processor 3 uses $J_n$ the as the jerk value.

Seen in FIG. 3, jerk curve 30 has a value of $J_n$ at sample time n and throughout the duration of segment 5. The values of jerk for segments 5, 6, and 7 will always be less than or equal to the command values. In this exemplary case, the jerk value required to reach the end conditions represents an acceleration to a higher velocity.

Also in FIG. 3, acceleration curve 32 exhibits the acceleration corresponding to jerk curve 30 where the acceleration value of segment 1 is negative. Velocity curve 34 exhibits the velocity corresponding to jerk curve 30 and acceleration curve 32 where the velocity value of segment 1 is negative.

Processor 3 also applies the correct signs to the jerk value. For all moves that start with zero initial conditions, the sign of jerk in segment 1 will be opposite of the sign in segment 3. However, in the case where there are non-zero initial conditions, the sign of jerk in segment 1 and segment 3 may be the same. Motion algorithms can be used to determine the correct signs for jerk, velocity, acceleration, and deceleration.

Figure 4:
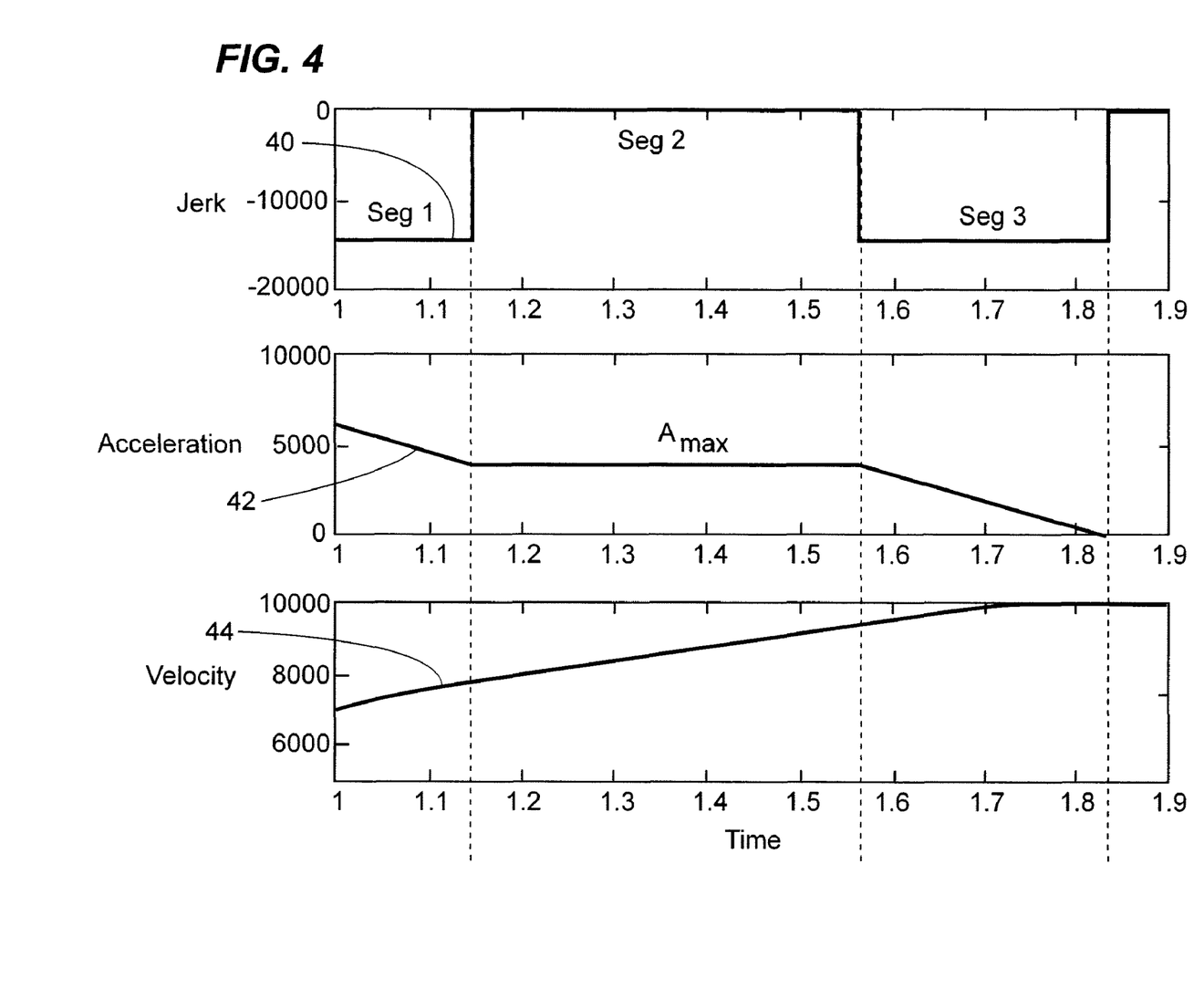
FIG. 4 is a stacked graph showing a path command versus time on a common time scale throughout segments 1-3.

An exemplary case in FIG. 4 is a stacked graph showing a path command versus time on a common time scale in segments 1-3, in the first phase of the move. Jerk curve 40 maintains a constant value in each individual segment. The magnitude of jerk in segments 1 and 3 are equal. Acceleration curve 42 exhibits the acceleration corresponding to jerk curve 40 and reaches its maximum value in segment 2. Velocity curve 24 exhibits the velocity corresponding to jerk curve 40 and acceleration curve 42 in segments 1-3.

Illustrated in FIG. 4 and shown by curve 42, the initial acceleration value is greater than the commanded acceleration value. Here, the first action of the path generator is a deceleration to the maximum acceleration value. This yields a condition where the signs of jerk in segments 1 and 3 are equal.

As previously mentioned, the path planner may or may not require all of segments 1-7 to complete a move successfully. Processor 3 determines the number of discrete time segments required to complete the move. In the first phase, the path planner determines which of segments 1-3 are required. Segment 4 is not calculated as it is considered the end conditions for the first phase. If the motion profile does reach segment 4, processor 3 continues sampling as usual. The second phase takes over when it is time to change the jerk value in order to reach the end conditions.

Referring back to the first phase, using known kinematic equations, processor 3 solves for the peak acceleration needed to reach the end conditions (the beginning of segment 4). Processor 3 compares the peak acceleration to the maximum acceleration allowed by the move. If the peak acceleration is less than the maximum allowed acceleration, then segment 2 is not required. If the peak acceleration is greater than the maximum allowed acceleration, then the second segment is required to limit the peak acceleration.

Mentioned above, prior to commanding any motion, processor 3 calculates the solution required to complete the first phase of the move for every sample period. To simplify the path planning algorithm, in the first phase, processor 3 commands motion to reach segment 4. In the first phase, the start of segment 4 is considered the end conditions for the move.

Figure 5:
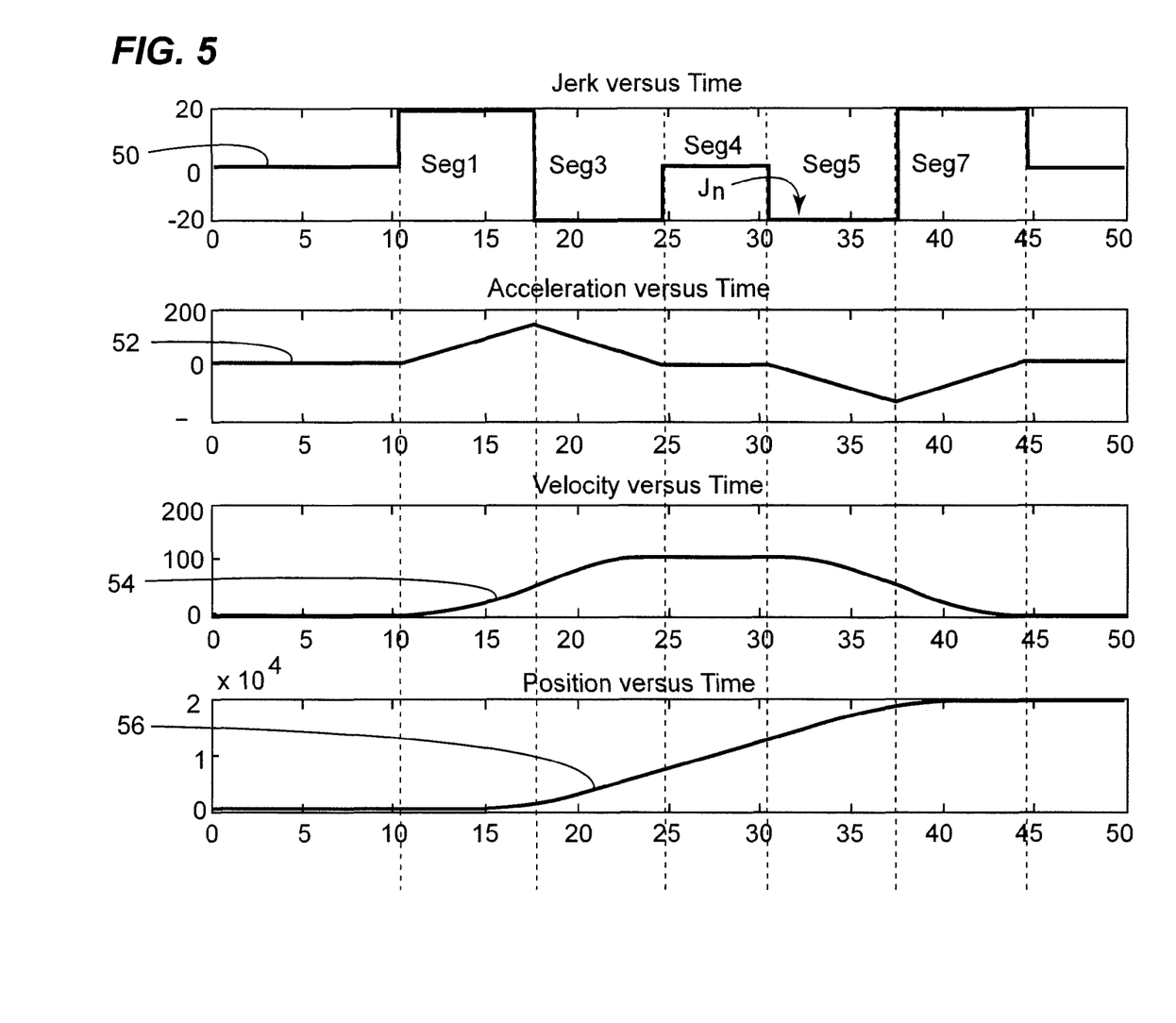
FIG. 5 is a stacked graph showing a path command versus time on a common time scale without segments 2 and 6.

In some cases, segment 2 is not required to complete the first phase of a move. FIG. 5 illustrates an exemplary case of when segment 2 is not required. FIG. 5 is a stacked graph showing a path command versus time on a common time scale. The motion profile of FIG. 5 includes two segments from the first phase, a constant velocity segment, and two segments from the second phase. In FIG. 5, segment 2 is not required because the maximum velocity of curve 54 is too low to allow the maximum acceleration to be reached prior to needing to reduce the acceleration to zero to reach and sustain the desired maximum velocity (segment 4). In curve 52, the peak acceleration reached is less than the maximum allowed acceleration.

In segment 1 of acceleration curve 52, the acceleration rate is increasing and in segment 3 the acceleration rate is decreasing. Therefore, acceleration curve 52 follows a triangular acceleration profile from segments 1-3. Acceleration curve 52 follows the triangular shaped profile because processor 3 implements the shortest path without exceeding any constraints. The displacement for a controlled device is shown by displacement curve 56, which corresponds to jerk 50, acceleration 52, and velocity 54 profiles.

Also seen in FIG. 5, the second phase begins at the start of segment 5. In particular, the move continues through a constant velocity segment (segment 4) until commanded jerk value, $J_c$, is greater than the calculated jerk value for a current sample period, $J_n$, but less than the calculated jerk value for the next sample period, $J_{n+1}$. At the beginning of the second phase (segment 5), at time n, processor 3 uses $J_n$ the as the jerk value.

Jerk curve 50 has a value of $J_n$ at sample time n and throughout the duration of segment 5. The values of jerk for segments 5, 6, and 7 will always be less than or equal to the command values. In this case segment 6 is not required to reach the end conditions of the move, so it is not shown. In FIG. 5, the jerk value required to reach the end conditions represents a deceleration to a lower velocity.

In contrast, all of segments 1, 2, and 3 are required to complete the first phase of the move when the maximum velocity is large enough that maximum acceleration is reached. In other words, the move requires the constant acceleration segment (segment 2) to reach the commanded velocity.

Figure 6:
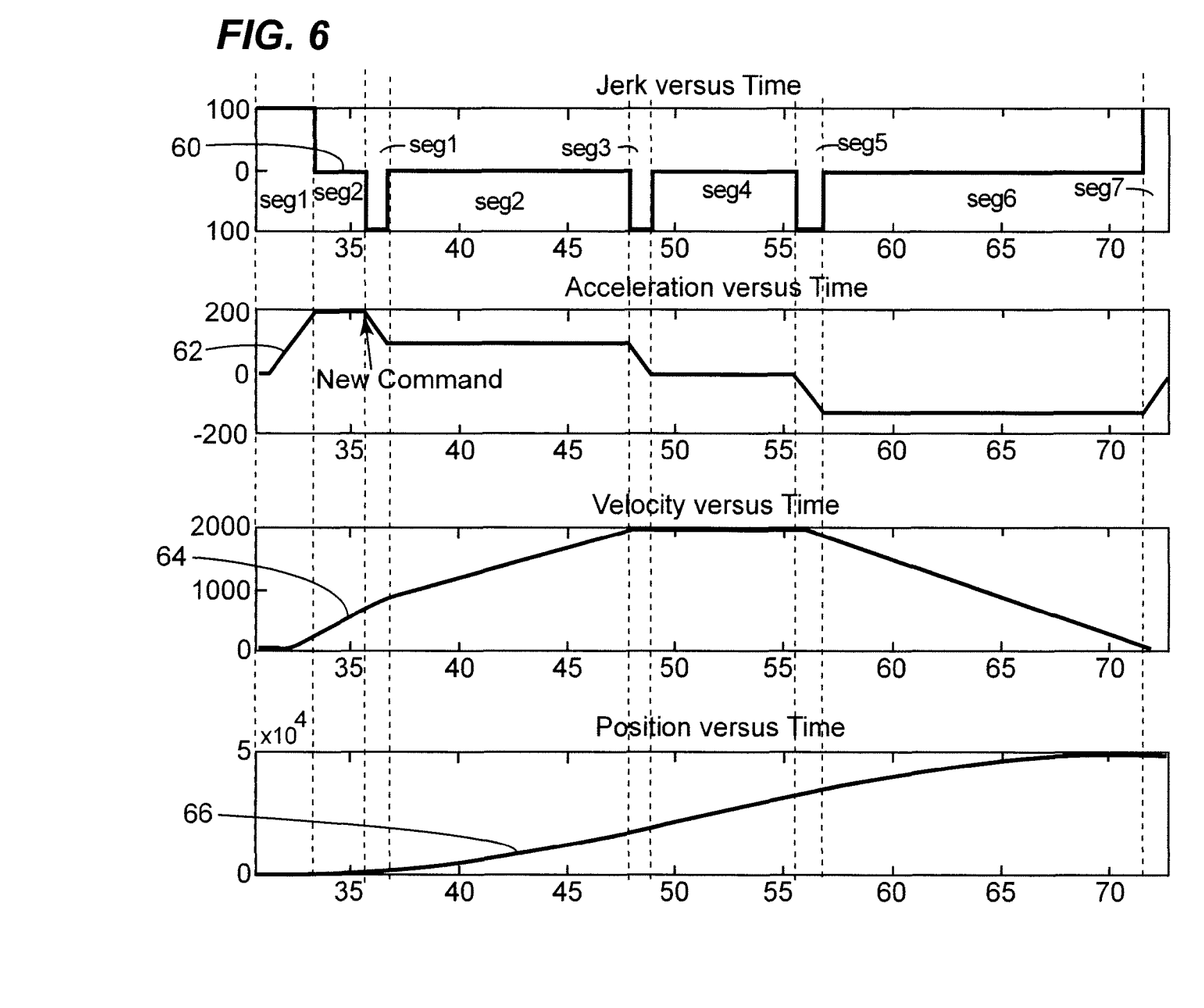
FIG. 6 is a stacked graph showing a path command versus time on a common time scale with a new move command.

In an exemplary case illustrated by FIG. 6, all three segments 1, 2, and 3 are required to compete the first phase of the move. FIG. 6 is a stacked graph showing a path command versus time on a common time scale. In this case, a move in-progress is aborted by a user-specified new move command. The new move command does not violate programmed limit values of the move. The displacement for a controlled device is shown by displacement curve 66, which corresponds to jerk 60, acceleration 62, and velocity 64 profiles.

During segment 2 of the move, a new input command value is received giving jerk an absolute value of 100. In acceleration curve 62, the acceleration of that segment 2 has a value greater than the new commanded acceleration. Therefore, the move must decelerate to the new maximum acceleration. In addition the move must be jerk limited and to reach the desired maximum velocity.

The effect of the new jerk command on the motion characteristics can be seen in acceleration curve 62 and velocity curve 64. Acceleration curve 62 decelerates to reach the new maximum acceleration. Processor 3 implements the new commanded jerk value and goes through another segment 1 beginning the first phase again. This allows the move to decelerate from the acceleration value of 200 to the new maximum acceleration value of 100. While acceleration curve 62 is at maximum constant acceleration, velocity curve 64 is linearly increasing to the desired maximum velocity.

In another exemplary embodiment, processor 3 may reduce jerk during an active move. A command may be executed that reduces the maximum jerk and either leaves maximum acceleration at the current value or reduces it. In this case, the move has a problem. To use the new jerk value requires that the move exceeds the maximum velocity. Processor 3 will not violate programmed limit values, such as the maximum velocity or other maximum values, for example.

Therefore, the current jerk value is necessary to reach the maximum velocity without overshooting. Processor 3 generates a warning and the move continues using the current commanded values for jerk and acceleration until acceleration completes. At this point, processor 3 implements the new values.

Figure 7:
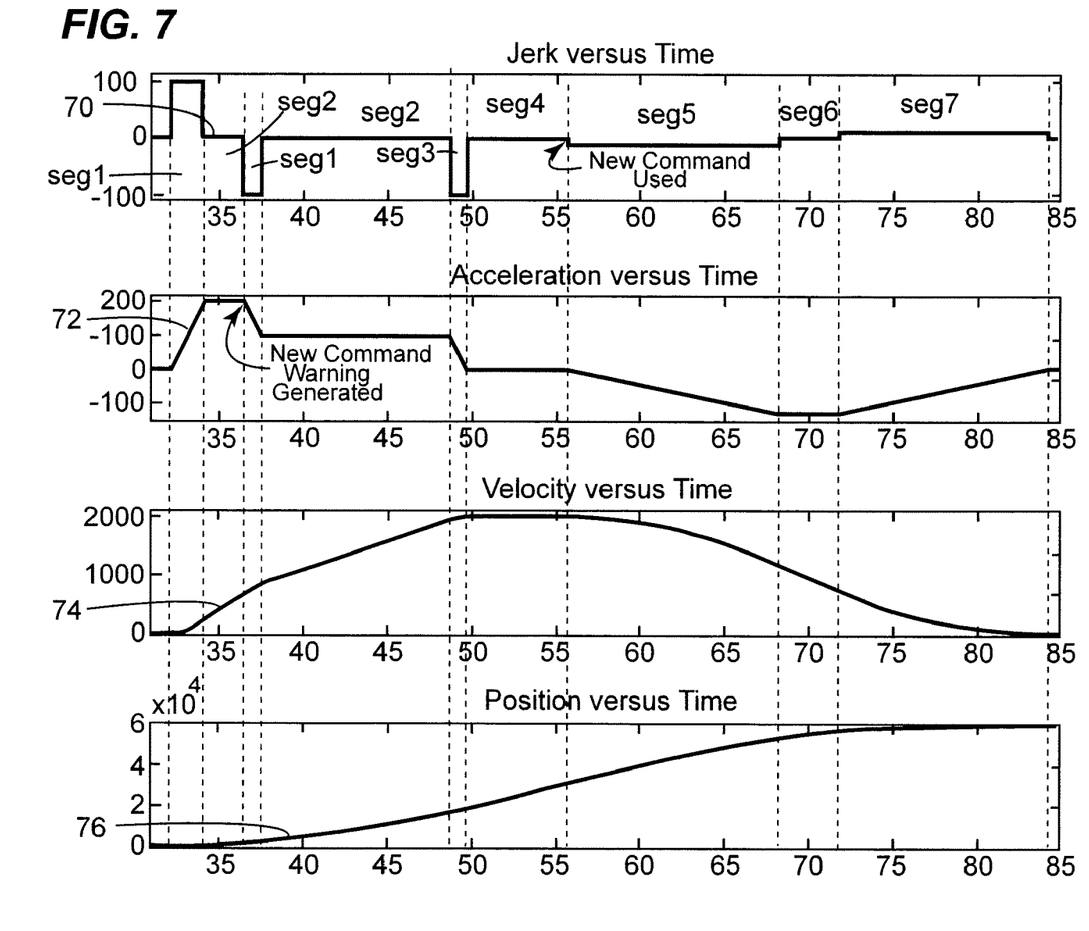
FIG. 7 is a stacked graph showing a path command versus time on a common time scale with a new move command that violates programmed limit values.

FIG. 7 is an exemplary case of when a warning is generated in the manner described above. FIG. 7 is a stacked graph showing a path command versus time on a common time scale. While in segment 2 of jerk curve 70, an input is received reducing the jerk value from 100 to 10 and the maximum acceleration from 200 to 100. However, using the new commanded jerk value of 10 requires that the move exceed the command's maximum velocity. In other words, the new move command that lowers the jerk value to 10 would not allow acceleration to reach zero prior to passing through the maximum velocity. Because of the slowed rate, acceleration curve 72 would not reach zero fast enough to reach the command's maximum velocity. The command's maximum velocity value would be overshot, which would violate the programmed limit values. Since processor 3 will not violate those values, processor 3 generates a warning and continues the move using the original jerk value of 100. Accordingly, jerk curve 70, acceleration curve 72, and velocity curve 74 continue the move using the original commanded values for jerk and acceleration until the start of segment 5.

In segment 5 of the move profile shown in FIG. 7, the second phase of the move begins, and processor 3 assigns jerk curve 70 the new value of 10. Acceleration curve 72 decelerates accordingly with the new jerk value throughout segment 5. Velocity curve 74 exhibits the velocity corresponding jerk curve 70 and acceleration curve 72. Furthermore, the displacement for a controlled device is shown by displacement curve 76, which corresponds to jerk 70, acceleration 72, and velocity 74 profiles.

While the first phase of processor 3 commands motion to reach segment 4, the second phase monitors the first phase to determine when it is necessary to decelerate or accelerate to reach the desired end conditions. Thus, the currently executing move serves as the initial conditions for the deceleration equations. In the second phase, the path planner solves for segments 5, 6, and 7. The values of jerk for segments 5, 6, and 7 will always be less than or equal to the command values.

In the second phase, the path planner may or may not require segment 6 to complete a move successfully. First, processor 3 makes a calculation for peak deceleration that assumes there is no limit due to the command. Processor 3 then compares the calculated peak deceleration to the maximum allowed deceleration. If the calculated peak deceleration is less than the maximum allowed deceleration, then segment 6 is not required. If the calculated peak deceleration is greater than the maximum allowed deceleration, segment 6 is required. In that case, another algorithm can be used to expresses the use of segment 6, which will insert a constant deceleration segment. In the second phase, peak acceleration can also be calculated when the initial velocity at the start of segment 5 is lesser than the target velocity.

Figure 8:
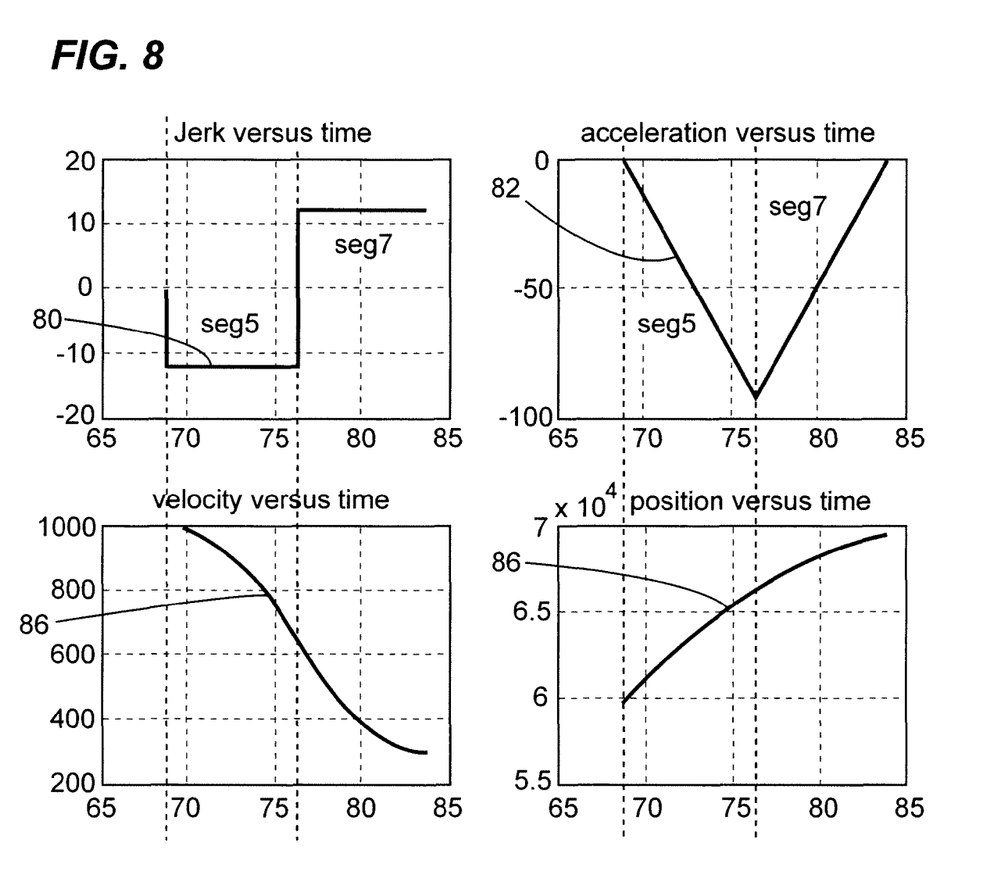
FIG. 8 is a graphical depiction of a path command versus time on a common time scale throughout segments 5-7 without segment 6.

FIG. 8 illustrates an exemplary case when segment 6 is not required to complete the move. FIG. 8 shows a path command versus time on a common time scale. In FIG. 8, segment 6 is not required because the calculated peak deceleration is less than the maximum allowed deceleration.

In segment 5 of acceleration curve 82, the acceleration rate is decreasing and in segment 7, the acceleration rate is increasing. Therefore, acceleration curve 82 follows a triangular deceleration profile from segments 5-7. Acceleration curve 82 follows a triangular shaped profile because processor 3 implements the shortest path without exceeding any constraints.

Jerk curve 80 illustrates the derivative move profile of acceleration curve 82 and maintains a constant value in individual segments 5 and 7. Velocity curve 84 exhibits the velocity corresponding to jerk curve 80 and acceleration curve 82 in segments 5 and 7. The displacement for a controlled device is shown by displacement curve 86, which corresponds to jerk 80, acceleration 82, and velocity 84 profiles.

Again, the triangular profile results when deceleration is not limited. Processor 3 implements the shortest deceleration path that yields without exceeding any constraints when deceleration starts on a sample period. Therefore, the path of curve 82 follows a triangular shaped deceleration curve.

Alternatively, if segment 6 is required to complete the move, processor 3 inserts a constant deceleration segment.

In the second phase, processor 3 solves for the jerk required to successfully meet the end conditions for deceleration. Depending on the end conditions, the deceleration solution may require deceleration to a lower velocity or acceleration to a higher velocity. Even if the jerk/deceleration slope is small, processor 3 can always solve for it. However, the jerk value must still be as close possible to the command value to allow processor 3 to generate path profiles that represent the least time to complete while not exceeding any of the command parameters or constraints. Also, the second phase begins on a sample period, so processor 3 generates the motion profile exhibiting the shortest time path where the calculated jerk value required to successfully meet end conditions is implemented on a sample period, at the start of segment 5.

Processor 3 generates a path profile by following the command parameters as closely as possible to reach the end conditions for the move. To achieve this requirement of the path generator, processor 3 solves for the jerk that satisfies the end conditions for the current sample period and for the next sample period as well. The path planner then compares these values to the commanded jerk value. When the commanded jerk value is in between the two values, the time optimal solution is in between the two sample periods. In that case, processor 3 uses the jerk for the current sample period to start the second phase of the move because that jerk value allows jerk to be as great as possible without exceeding the command value.

Although the trajectory computed by reducing jerk will not be the ideal trajectory, the command value will not be exceeded. Therefore, the ideal trajectory is known and lies somewhere in between the two sample periods. It is preferable that the sample period is as short as possible to improve motion control.

Again, the final trajectory to satisfy the end conditions does not have to be one that decelerates. Depending on the final conditions of the move, the final trajectory could be one that accelerates. In particular, the start of the second phase, or segment 5, could be a deceleration or an acceleration segment. In addition, non-zero velocity end conditions are acceptable. A non-zero velocity end condition can even have a value greater than the move's maximum velocity as it could be a result of one move blending into another.

The construction and arrangement of the path planner system and method, as described herein and shown in the appended figures, is illustrative only. Although only a few embodiments of the invention have been described in detail in this disclosure, those skilled in the art who review this disclosure will readily appreciate that many modifications are possible (e.g. variations in sizes, dimensions, structures, shapes and proportions of the various elements, values of parameters, mounting arrangements, use of materials, orientations, etc.) without materially departing from the novel teachings and advantages of the subject matter recited in the appended claims. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and omissions may be made in the design, operating conditions and arrangement of the preferred and other exemplary embodiments without departing from the spirit of the embodiments of the invention as expressed in the appended claims. Therefore, the technical scope of the present invention encompasses not only those embodiments described above, but all that fall within the scope of the appended claims.

What is claimed is:

1. A system for generating a motion profile in real time, the system comprising a processor, the processor configured to:
   break a move into a first phase and a second phase, the first phase comprising commanding the move toward a constant velocity segment, and the second phase comprising monitoring the first phase to determine when during a move in progress it is necessary to implement a jerk value required to successfully reach end conditions;
   calculate a jerk value required to successfully reach the end conditions for a current sample period ($J_n$);
   calculate a jerk value required to successfully reach the end conditions for a next sample period ($J_{n+1}$); and
   compare the calculated jerk value required for the current sample period ($J_n$) and the calculated jerk value required for the next sample period ($J_{n+1}$) to a commanded jerk value ($J_c$).

2. The system of claim 1, the processor further configured to:
   implement the jerk value required to successfully reach the end conditions at a point at which the second phase takes control of the move in progress,
   wherein the point at which the second phase takes control of the move in progress can occur any time after the first phase begins.

3. The system of claim 1, the processor further configured to:
   split processing of first phase calculations and second phase calculations across sample periods.

4. The system of claim 1, the processor further configured to:
   generate the motion profile without violating programmed limit values, the motion profile exhibiting a shortest-time path to reach a target position, wherein the jerk value required to successfully reach the end conditions is implemented on a sample period.

5. The system of claim 4, the processor further configured to:
   abort the move in progress upon receiving at least one user-specified new move command value, wherein the at least one new move command value does not violate the programmed limit values; and
   continue the move implementing the at least one new command value.

6. The system of claim 4, the processor further configured to:
   generate a warning upon receiving at least one user-specified new move command value, wherein the at least one new move command value violates the programmed limit values; and
   continue the move in progress using existing command values.

7. The system of claim 1, the processor further configured to:
   determine a number of discrete time segments required to complete the move,
   wherein the motion profile comprises a plurality of discrete time segments between an initial position and a target position.

8. The system of claim 7, wherein:
   a point at which the second phase takes control of the move in progress begins concurrently with one of the plurality of discrete time segments.

9. The system of claim 1, the processor further configured to:
   apply correct signs to input command values, wherein input command values for jerk, velocity, acceleration, and deceleration are user-specified as absolute values.

10. The system of claim 1, the processor further configured to:
    implement the jerk value required to successfully reach the end conditions at a point at which the second phase takes control of the move in progress,
    wherein the point at which the second phase takes control occurs when the commanded jerk value ($J_c$) is between the calculated jerk value for the current sample period ($J_n$) and the calculated jerk value for the next sample period ($J_{n+1}$).

11. The system of claim 10, wherein the jerk value required to successfully reach the end conditions is implemented at a time (n) of the current sample period.

12. The system of claim 1, the processor further configured to:
    implement the calculated jerk value for the current sample period ($J_n$) at a point at which the second phase takes control of the move in progress,
    wherein the point at which the second phase takes control occurs at a time (n) of the current sample period when the commanded jerk value ($J_c$) is between the calculated jerk value for the current sample period ($J_n$) and the calculated jerk value for the next sample period ($J_{n+1}$).

13. A system for generating a motion profile in real time, the system comprising:
    at least one input/output module configured to receive command signals; and
    a processor, the processor configured to:
    transmit the command signals based upon the motion profile;
    break a move into a first phase and a second phase;
    calculate a point at which the second phase must take control of a move in progress in order to reach a target position;
    calculate a jerk value required to successfully reach end conditions for a current sample period ($J_n$);
    calculate a jerk value required to successfully reach the end conditions for a next sample period ($J_{n+1}$); and
    compare the calculated jerk value required for the current sample period ($J_n$) and the calculated jerk value required for the next sample period ($J_{n+1}$) to a commanded jerk value ($J_c$).

14. The system of claim 13, wherein:
    the point at which the second phase must take control of the move in progress occurs on a sample period, and
    wherein the point at which the second phase must take control of the move in progress can occur any time after the first phase begins.

15. The system of claim 13, the processor further configured to:
    implement a jerk value required to successfully reach end conditions at the point at which the second phase must take control of the move in progress.

16. A method for generating a motion profile in real time, the method comprising:
    breaking a move into a first phase and a second phase;
    commanding the move toward a constant velocity segment during the first phase;
    monitoring the first phase to determine when during a move in progress it is necessary to implement a jerk value required to successfully reach end conditions;

calculating a jerk value required to successfully reach the end conditions for a current sample period ($J_n$);

calculating a jerk value required to successfully reach the end conditions for a next sample period ($J_{n+1}$); and comparing the calculated jerk value required for the current sample period ($J_n$) and the calculated jerk value required for the next sample period ($J_{n+1}$) to a commanded jerk value ($J_c$).

17. The method of claim 16, further comprising:

implementing the jerk value required to successfully reach the end conditions at a point at which the second phase takes control of the move in progress, wherein the point at which the second phase takes control of the move in progress can occur any time after the first phase begins.

18. The method of claim 16, further comprising:

generating the motion profile without exceeding programmed limit values, the motion profile exhibiting a shortest-time path to reach a target position, wherein the jerk value required to successfully reach the end conditions is implemented on a sample period.

19. The method of claim 16, further comprising:

implementing the a jerk value required to successfully reach the end conditions at a point at which the second phase takes control of the move in progress, wherein the point at which the second phase takes control occurs when the commanded jerk value ($J_c$) is between the calculated jerk value for the current sample period ($J_n$) and the calculated jerk value for the next sample period ($J_{n+1}$).

20. The method of claim 16, further comprising:

implementing the calculated jerk value for the current sample period ($J_n$) at a point at which the second phase takes control of the move in progress, wherein the point at which the second phase takes control occurs at a time (n) of the current sample period when the commanded jerk value ($J_c$) is between the calculated jerk value for the current sample period ($J_n$) the calculated jerk value for the next sample period ($J_{n+1}$).

* * * * *

UNITED STATES PATENT AND TRADEMARK OFFICE
CERTIFICATE OF CORRECTION

PATENT NO. : 7,919,940 B2
APPLICATION NO. : 11/875913
DATED : April 5, 2011
INVENTOR(S) : Miller et al.

It is certified that error appears in the above-identified patent and that said Letters Patent is hereby corrected as shown below:

In Column 5, in Table "1-continued", under "Description", Line 2, delete "one" and insert -- once --, therefor.

In Column 6, Line 49, delete "$J_n$ the" and insert -- $J_n$ --, therefor.

In Column 8, Line 2, delete "$J_n$ the" and insert -- $J_n$ --, therefor.

In Column 11, Line 45, in Claim 5, delete "docs" and insert -- does --, therefor.

In Column 12, Line 5, in Claim 9, delete "arc" and insert -- are --, therefor.

In Column 14, Line 2, in Claim 19, delete "the a" and insert -- the --, therefor.

In Column 14, Line 17, in Claim 20, delete "($J_n$)the" and insert -- ($J_n$) and the --, therefor.

Signed and Sealed this
Twenty-fifth Day of October, 2011

David J. Kappos
*Director of the United States Patent and Trademark Office*